United States Patent
Hunter et al.

[15] 3,689,493
[45] Sept. 5, 1972

[54] 5-,6-AND 7-AZACHROMONES
[72] Inventors: William Hubert Hunter, Amersham; John Barry Harbridge, Benfleet, both of England
[73] Assignee: Fisons Pharmaceuticals Ltd., Loughborough, Leicestershire, England
[22] Filed: March 17, 1970
[21] Appl. No.: 20,409

[52] U.S. Cl......260/295 F, 260/240 D, 260/247.2 R, 260/247.2 B, 260/293.58, 260/294.9, 260/295 R, 260/295 K, 260/297 R, 424/248, 424/263, 424/267
[51] Int. Cl.............................................C07d 99/04
[58] Field of Search.......260/295 F, 293.58, 247.2 R, 260/247.2 B

[56] References Cited

OTHER PUBLICATIONS

Bonsall et al., J. Chem. Soc. C 1967, (19), 1836– 9.

Primary Examiner—Henry R. Jiles
Assistant Examiner—G. Thomas Todd
Attorney—Wenderoth, Lind & Ponack

[57] ABSTRACT

Azachromone-2-carboxylic acids, processes for their preparation, pharmaceutically acceptable derivatives thereof and compositions containing them. The compounds of the invention are indicated for use in inhibiting the effects of antibody-antigen reactions.

8 Claims, No Drawings

5-, 6- AND 7-AZACHROMONES

This invention relates to novel azachromones, processes for their production, and to compositions containing azachromones.

According to our invention we provide compounds of formula I,

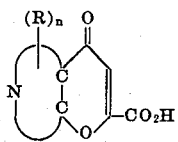

I in which

represents a pyridine ring fused on to the pyrone ring,
R represents an alkyl or an alkoxy group containing from one to six carbon atoms, and
n is 0, 1 or 2,
with the proviso that the group

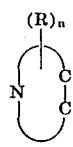

does not represent the group

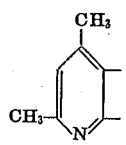

and pharmaceutically acceptable derivatives thereof.

According to our invention we also provide a process for the production of a compound of formula I, or a pharmaceutically acceptable derivative thereof, which comprises reacting a compound of formula II,

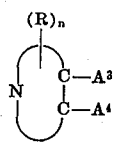

II in which

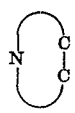

R, n and the proviso are as defined above, and $A^3$ and $A^4$ represent a chain or pair of groups (one of which may be hydrogen) convertible to the chain —CO—CH = C(COOH)—O— or a derivative thereof,
so as to convert the pair of groups $A^3$, $A^4$ to a chain —CO—CH = C(COOH)—O— or a derivative thereof,
and where necessary converting the resulting compound to a compound of formula I or a pharmaceutically acceptable derivative thereof.

The process for the production of the compound of formula I may be carried out by, a. cyclising a compound of formula III,

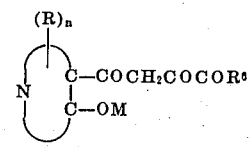

III in which R, n,

and the proviso are as defined above,
M represents a hydrogen or alkali-metal atom or an alkyl group, and
$R^6$ represents an —OM group or a group convertible thereto, b. dehydrogenation of a compound of formula IV,

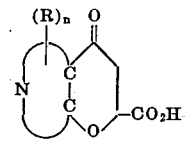

IV in which R, n,

and the proviso are as defined above, or c. oxidation or hydrolysis of the group D in a compound of formula V,

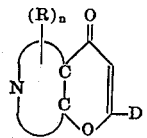

V in which R, n,

and the proviso are as defined above, and

D represents a group oxidizable or hydrolysable to a —COOH group.

The cylisation of process (a) may be carried out by heating the compound of formula III directly, or preferably in an organic solvent, e.g. glycerol or dioxan and preferably ethanol. The cyclisation may be carried out under neutral conditions or in the presence of an organic base, e.g. pyridine. The reaction is preferably carried out in the presence of a cyclisation agent, e.g. polyphosphoric, sulphuric, hydrochloric, acetic or toluene-p-sulphonic acid or a mixture thereof. Water may be present in the cyclisation reaction mixture. When a compound in which M is an alkyl group is used, simultaneous cyclisation and dealkylation may be achieved by use of HI or HBr as the cyclisation agent. Cyclisation may be carried out at a temperature of from about 15° C to about 150° C, if desired under reflux. $R^6$ may, where necessary, be converted to a group OM either during the cyclisation or by conventional techniques.

The dehydrogenation of process (b) may be carried out by oxidation, use of a dehydrogenation catalyst or by halogenation followed by dehydrohalogenation. Dehydrogenation may be effected by, for example, the use of selenium dioxide, palladium black or chloranil. Alternatively the chromanone may be halogenated using, for example, N-bromosuccinimide in an inert solvent, or pyridinium perbromide in an inert solvent, e.g. chloroform, in the presence of a free radical catalyst, e.g. benzoyl peroxide, followed by dehydrobromination of the resulting 3-bromo derivative to yield the desired chromone compound.

In process (c) the group D may be a nitrile, amide or ester group which may be hydrolysed to a carboxylic acid group; an alkyl or substituted alkyl group, for example a methyl, hydroxymethyl, or halomethyl (e.g. chloromethyl) group; an acyl group, e.g. a formyl or acetyl group; an alkenyl or aralkenyl group, e.g. a vinyl, w-trichloromethyl vinyl or styryl group. All the groups mentioned above may be hydrolysed or oxidized to the desired carboxylic acid group. The oxidation or hydrolysis of the above groups may be carried out in conventional manner. Thus the oxidation may be carried out under non-basic conditions, for example using acid potassium dichromate or acid potassium permanganate.

The compounds of formula IV may be made by cyclising a compound of formula VI,

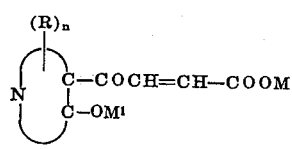

VI in which R, n,

M and the proviso are as defined above, and $M^1$ represents hydrogen or an alkali metal.

The cyclisation may be carried out by treating the compound of formula VI with an alkali or an organic base in a solvent which is inert under the reaction conditions. If desired the compound of formula VI need not be isolated and the cyclisation and the dehydrogenation of process (b) may be carried out simultaneously, for example by the introduction of a suitable oxidant, e.g. selenium dioxide, into the cyclisation reaction.

Compounds of formula V may be made by cyclisation of a compound of formula VII,

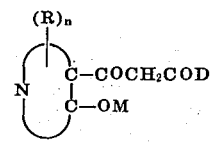

VII in which R, n, M, D,

and the proviso are as defined above, using the conditions described above for the cyclisation of process (a).

Alternatively the compounds of formula V may be made by cyclisation of a compound of formula VIII,

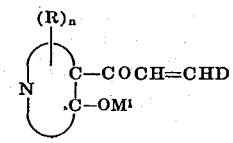

VIII in which R, n, D, $M^1$,

and the proviso are as defined above, using the conditions set out above for the cyclisation of the compound of formula VI, and dehydrogenating the resulting 2-substituted chromanone compound using the conditions set out above for process (b).

In the above processes it is preferred that the group D is a methyl or a styryl group.

Compounds of formula III and VII, which may be conveniently expressed as the combined formula IX,

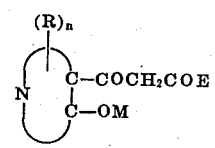

IX in which R, $n$, M,

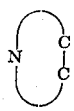

and the proviso are as defined above, and
E represent a group —COR⁶ or a group D as defined above,
may be made by condensation of a compound of formula X,

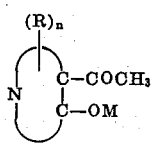

X in which R, $n$, M,

and the proviso are as defined above,
with a compound of formula XI, $$R^7CZ—E \qquad XI$$

in which E is as defined above,
R⁷ is a group reactive with a hydrogen in the —COCH₃ group of the compound of formula X, and
Z represents a carbonyl oxygen atom or two halogen atoms, and
when Z represents two halogen atoms, hydrolysis of the resulting compound.

R⁷ may suitably be an alkoxy, amino, alkylamino, substituted amino or substituted alkyl amino group. Suitable compounds of formula XI include the esters, and in particular the C 1-5 alkyl esters, of oxalic acid, and compounds of formula XI$a$:

$$R^{10}O—C\,Hal_2—COOR^{10} \qquad XIa$$

in which R¹⁰ represents an ether forming group, in particular alkyl C 1-5, and Hal represents halogen, preferably chlorine or bromine.

The reaction may be carried out at a temperature of from 25° to 150° C. In the case of oxalate esters the reaction is desirably carried out in the presence of a condensation agent, e.g. sodium ethoxide, sodium hydride, sodamide or metallic sodium. Where a compound of formula XI$a$ is used a hydrolysis step, and preferably an acid hydrolysis step, is required and it may be preferred to carry out the reaction in the presence of a finely divided platinum group metal catalyst. The reaction may be carried out in an organic solvent, e.g. ether, dioxan, ethanol, benzene, toluene or tetrahydrofuran. It is preferred to use an excess of the compound of formula XI and to carry out the reaction under anhydrous conditions. The reaction product usually contains the desired compound of formula IX but cyclisation of this compound may take place spontaneously or may be brought about in situ by acidifying the reaction mixture.

Compounds of formula IX may also be made by reacting an appropriate compound of formula X with a compound of formula XII, $$R^8CO\,E \qquad XII$$

in which R⁸, is halogen atom, and
E is as defined above.

The reaction may be carried out in the same manner as the above reaction involving the compound of formula XI save that an acid binding agent is used in place of the condensation agent and that the use of an anhydrous organic solvent is desirable. The reaction product from this process usually contains an intermediate of formula XIII:

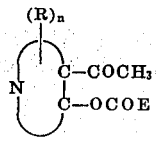

XIII in which R, $n$, E,

and the proviso are as defined above,
or a precursor or derivative thereof, though in some cases rearrangements of this intermediate to yield the compound of formula I or V may occur spontaneously. Furthermore, where an acid chloride, of formula XII e.g. oxalyl chloride, is reacted with a compound of formula X in pyridine a compound of formula I, or of formula V or a salt thereof, may be produced directly. Rearrangement of the intermediate may also be achieved in situ by heating in a medium such as glycerol. Alternatively the intermediate may be isolated and rearranged at a temperature of about 15° to 150° C under non-acidic conditions, e.g. in the presence of a base, and preferably in an inert solvent, e.g. benzene, anisole or dioxan. The reaction is preferably carried out under anhydrous conditions.

Compounds of formula IX may also, in some cases, be prepared by reacting an appropriately substituted salicyclic acid or ester thereof with a compound of formula XIV:

$$CH_3CO\,COOR^{11} \qquad XIV$$

in which R¹¹ is an ester forming group, in particular an alkyl C 1-5 group. The reaction is desirably carried out in an inert medium and preferably in the presence of a condensation agent, e.g. an alkali metal alkoxide.

Compounds of formula VI and VIII, which may conveniently be expressed as the combined formula XV,

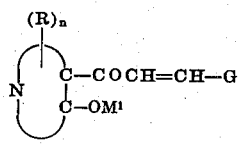

XV in which, R, n, M¹,

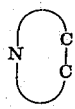

and the proviso are as defined above, and
G represents a group —COOM or a group D as defined above,
may be made by reacting a compound of formula XVI,

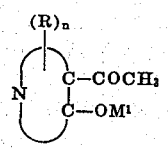

XVI in which R, n, M¹,

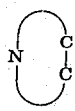

and the proviso are as defined above, with a compound of formula XVII,

<p style="text-align:center">GCHO     XVII</p> in which G is as defined above,
in the presence of a base, e.g. aqueous NaOH or in the presence of a mineral acid. A water miscible solvent, e.g. ethanol, may be added to facilitate the reaction.

In the processes outlined above we believe that the compounds of formulas III, IX and XV are present as intermediates formed in the conversion of the starting materials to a compound of formula I. However in many cases the intermediates are formed under those conditions required to achieve further reaction and therefore exist only transitorily. While for clarity the processes have been described as if the intermediates of formulas III, IX and XV are isolated prior to further reaction the invention embraces those processes wherein the intermediate undergoes further reaction, separation or isolation from the reaction mixture in which it has been prepared.

The compound of formula I and the intermediates therefore may be recovered and purified using techniques conventional in the recovery and purification of similar known compounds.

The starting materials for the production of the intermediates used in the production of the compounds of formula I are either known or may be made in a manner analogous to those known for the manufacture of similar known compounds.

The processes outlined above may produce the free acids of formula I or may yield derivatives thereof. It is also within the scope of the present invention to treat the product of any of the above processes, after any isolation and purification steps that may be desired, in order to liberate the free acid, therefrom or to convert one form of derivative into another. The methods used to isolate and purify any product may be those conventionally used. Thus, salts may be prepared by the use of alkaline conditions during the recovery and purification of the compounds. Alternatively, the free acid may be obtained and subsequently converted to a desired salt by neutralization with an appropriate base, e.g. an organic amine, or an alkali such as an alkali-metal or alkaline-earth metal hydroxide, carbonate or bicarbonate, preferably a mild base or alkali such as sodium carbonate or bicarbonate. Where the compound is recovered in the form of a salt, this salt may be converted to a more desirable salt, for example by a metathetical process. The esters may be obtained as a result of having used appropriate starting materials, for example by the reaction of a dialkyl oxalate with a compound of formula X as hereinbefore described; may be formed by the reaction of an appropriate alcohol, alkyl sulphate or halo-compound with free carboxyl groups in the compound of formula I; or may be formed by the reaction of an appropriate alcohol with an acyl halide of the compound of formula I. Alternatively, transesterification techniques may be used to exchange one ester group for another. The amides may be readily obtained, for example, by dehydration of the ammonium salt or by reaction of an ester or acyl halide with an appropriate amino compound such as ammonium hydroxide or a primary or secondary amine or an amino acid. Alternatively, the free acid of formula I may be condensed with an alkyl haloformate (e.g. chloroformate) in the presence of an organic base such as triethylamine, to yield a mixed anhydride which is then treated with an aminoacid or ester thereof in the presence of a suitable solvent to give an N-carboxyalkyl substituted amide. The mixed anhydride need not be isolated from the reaction mixture in which it was prepared, but may be treated in situ.

According to our invention we also provide a pharmaceutical composition comprising a compound of formula Ia,

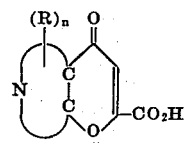

Ia in which R, n and

are as defined in connection with formula I, save that there is no proviso,
or a pharmaceutically acceptable derivative thereof, in combination with a pharmaceutically acceptable diluent or carrier.

Pharmaceutically acceptable derivatives of the compounds of formula Ia include pharmaceutically acceptable salts (notably water soluble salts), esters and amides of one or more of the 2-carboxylic acid groups. Suitable salts include ammonium salts, alkali metal salts (e.g. sodium, potassium and lithium salts), alkaline earth metal salts (e.g. magnesium and calcium salts); and salts with organic bases, e.g. amine salts derived from mono-, di- or tri-lower alkyl or lower alkanolamines, (such as triethanolamine or triethylamine) and salts with heterocyclic amines such as piperidine or pyridine.

Esters which may be mentioned include simple alkyl esters derived from alcohols containing from one to 10 carbon atoms (e.g. a methyl, ethyl, propyl, or pentyl ester) and alkylaminoalkyl esters, such as those of the general formula $-COO-R^{11}-NR^{111}R^{1111}$ wherein $R^{11}$ is a branched or straight alkylene chain (e.g. one containing from one to four carbon atoms such as a methylene, ethylene, propylene, isopropylene or tert. butylene group); and $R^{111}$ and $R^{1111}$ may be the same or different and each is selected from hydrogen or an alkyl group (e.g. a lower alkyl group such as a methyl, ethyl, propyl or butyl group) or together with the nitrogen atom form an heterocyclic ring such as a piperidine or morpholine ring. Examples of such basic esters are diethylaminoethyl and piperidinoethyl esters. The basic esters may be in the form of a physiologically acceptable acid addition salt thereof, e.g. the hydrochloric acid salt.

Amides which may be mentioned include simple amides derived from ammonia or primary or secondary aliphatic or aromatic amines, such as mono- or di-lower alkyl amines (for example diethylamine), aniline or a mono-alkylaniline such as methyl aniline; and more complex amides derived from amino acids such as glycine, i.e. amides of the formula $-CONR^1-R^{11}-COOH$, or salts and esters thereof, and from mono- or bis-(dialkylaminoalkyl) amines, i.e. amides of the formula $-CONR^1-R^{11}-N-R^{111}R^{1111}$ wherein $R^1$ is hydrogen or an alkyl group (e.g. a lower alkyl group such as a methyl, ethyl, propyl or butyl group) and $R^{11}$, $R^{111}$ and $R^{1111}$ have the values given above. The amides may exist in the form of a physiologically acceptable acid addition salt thereof, e.g. an hydrochloride.

Preferred pharmaceutically acceptable derivatives of the compounds of formula Ia are the sodium and ammonium salts, the alkyl, dialkylamino-alkyl and piperidinoethyl esters where the alkyl groups contain from one to six carbon atoms, e.g. ethyl groups, and amides derived from ammonia, aminoacids, e.g. glycine, and dialkylaminoalkyl amines, e.g. diethyl aminoethylamine.

The new compounds of formula I, and pharmaceutically acceptable derivatives thereof and the new compositions of the invention are useful because they have pharmacological properties. In particular they inhibit the release of toxic products which arise from the combination of certain types of antibody and specific antigen, e.g. the combination of reaginic antibody with specific antigen. In man, both subjective and objective changes which result from the inhalation of specific antigen by sensitized subjects may be markedly inhibited by administration of the new compounds. Thus, the new compounds are indicated for use in the treatment of 'extrinsic' allergic asthma. The new compounds may also be of value in the treatment of so-called 'instrinsic' asthma (in which no sensitivity to extrinsic antigen can be demonstrated) and in the treatment of other conditions in which antigen-antibody reactions are responsible for disease, for example, hay fever, urticaria and auto-immune diseases.

For the sake of simplicity the pharmaceutical compositions will be described with respect to the compounds of formula Ia only, but pharmaceutically acceptable derivatives thereof are to be understood to be included.

The nature of the composition and the pharmaceutically acceptable carrier or diluent will, of course, depend upon the desired mode of administration, which may be for example, orally (i.e. oesophagally); by inhalation; parenterally; or by topical application.

The composition may be formulated in the conventional manner with the customary ingredients. For example, the compositions may be put up as aqueous solutions or suspensions, as powders or in tablet, cream, lotion or syrup form.

The compositions of the invention generally comprise a minor proportion of the compound of formula Ia and a major proportion of carrier or diluent. Thus, for example, aqueous solutions for administration by means of a conventional nebulizer may contain up to about 10 percent by weight of the active ingredient in sterile water; and compositions for dispensing from a pressurized container comprising suspensions or solutions in liquefied propellants will contain, for example, about 0.2–5 percent by weight of the active ingredient.

The compounds of formula Ia are preferably administered by inhalation, notably in the treatment of allergic asthma. For such use, the compounds of formula Ia, preferably in the form of a salt, e.g. the sodium salt, may be dissolved or suspended in water and may be applied by means of a conventional nebuliser. However the administration of the compounds of formula Ia by means of an aerosol dispenser is an alternative to nebuliser administration. For administration from an aerosol dispenser, the medicament is dissolved or suspended in a liquified propellant medium. The propellants for present use may be for example of the halogenated hydrocarbon type, e.g. fluoro- or fluorhalo- hydrocarbons. Typical suitable propellants are those disclosed in U.S. Pat. No. 2,868,691. The propellant should be of course be of low toxicity, especially where the composition is to be ingested, e.g. inhaled, by the user. Where the compound of formula Ia is not soluble in the propellant, it may be necessary to add a surface-active agent, and preferably an anionic surface-active agent, to the composition in order to suspend the compound of formula Ia in the propellant medium, and such surface-active agents may be any of those commonly used for a similar purpose. The use of anionic surface-active agents in similar compositions is more fully described in British Pat. No. 1,063,512.

The compositions of the invention may also be administered in the form of powders by means of an insufflator device, e.g. that described in British Pat. No. 1,122,284. In order to improve the properties of the powder, it may be desired to modify the surface characteristics of the powder particles, for example, by coating them with a pharmaceutically acceptable material such as sodium stearate. In addition, fine particle sized powders of the active ingredients may be mixed with a coarser diluent material, such as lactose, which may be present in a smaller, equal, or greater amount than the active ingredients, for example in from 50 to 150 percent by weight of the compound of formula Ia and such other active ingredients as may be present.

Whilst the inhalation of medicament has been described above with particular reference to oral administration, it will be appreciated that it may be desirable to administer the medicament nasally. The term inhalation is therefore used herein to denote, where the context permits, both oral and nasal inhalation.

The compositions of the invention may also be administered as tablets, syrups and the like or by intradermal or intravenous injection in the conventional manner.

In addition to the interval administration, the compounds of formula Ia find use in compositions for topical application, e.g. as creams, lotions or pastes for use in dermatological treatments.

In addition to the compound of formula Ia and the ingredients required to present the compound in a form suitable for the selected mode of administration, other active ingredients may be present in the composition of the invention. Thus, in compositions for administration by inhalation, it may be beneficial to include a bronchodilator. Any bronchodilator may, within reason, be used. Suitable bronchodilators include isoprenaline, adrenalin, orciprenaline, isoetharine and derivatives thereof, particularly the salts thereof. The use of isoprenaline sulphate is preferred. The amount of bronchodilator used will vary over a broad range, depending, inter alia, upon the nature and activity of the bronchodilator and the compound of formula Ia used. However, the use of a minor proportion (i.e. less than 50 percent and preferably from 0.1 to 10 percent by weight of the bronchodilator based on the weight of the compound of formula Ia) is preferred.

As stated above, the compounds of formula Ia are indicated for use in inhibiting the effects of antibody-antigen reactions. In such treatment, the compound or composition of the invention may be administered by the chosen method to tee site of the antibody-antigen reaction in the therapeutically effective amount. The treatment may be one which requires repeated dosages of the medicament at regular intervals. The amount and frequency of medicament administered will depend upon many factors and no concise dosage rate or regiment can be generally stated. However, as a general guide, where the compounds are administered by inhalation to a patient suffering from acute allergic asthma, therapeutically useful results may be achieved when the compounds are administered at a dosage of 0.1 to 50 mg. Where the compounds are administered by the oral, i.e. oesophagal route, larger dosages may be given.

The invention will now be illustrated by the following Examples in which all parts and percentages are given by weight unless otherwise stated:

EXAMPLE 1

7 - Azachromone - 2-carboxylic acid a. 4-Formyl-3-hydroxypyridine

Iso-quinoline was oxidized to cinchomeronic acid by using concentrated $H_2SO_4$ and selenium at 270° C for 3 hours. The product was refluxed with acetic anhydride and, without purification of the intermediate product, was heated with acetamide at 115° C for 30 hr. to give cinchomeronimide.

Reaction of cinchomeronimide with sodium hypochlorite gave 3-aminoisonicotinic acid, which was diazotized with nitrous acid in cold dilute sulphuric acid, and then heated at 60° C with vigorous agitation to give 3-hydroxisonicotinic acid. From this acid the methyl ester was obtained by a modified Fischer-Spier technique using methanol, concentrated $H_2SO_4$ and 1, 2-dichloro-ethane. The methyl ester was reduced with $LiAlH_4$ to give 4-hydroxymethyl-3-hydroxypyridine, which was not isolated but was oxidized by $MnO_2$ in dilute sulphuric acid and chloroform, to yield 4-formyl-3-hydroxypyridine 12 parts of which were obtained from 150 parts of isoquinoline, after re-working the mother liquors of intermediate stages.

b. 4-Acetyl-3-hydroxypyridine (1)

A solution of methylmagnesium iodide in ether and tetrahydrofuran was prepared from:

| Magnesium turnings | 7.5 parts | |
|---|---|---|
| dry ether | 25 volumes | |
| iodomethane | 18.5 volumes | added |
| tetrahydrofuran | 25 volumes | gradually |

Further quantities of tetrahydrofuran were added at intervals to maintain the reaction. The mixture was heated gently for 20 minutes, and then the ether was distilled off (to a head temperature of 55° C). The solution was decanted from unreacted magnesium and added rapidly to a solution of 4-formyl-3-hydroxypyridine ( 9 parts) in warm dry tetrahydrofuran (50 volumes). A vigorous reaction occurred. After the addition, the resulting mass was broken up, more tetrahydrofuran added, and the mixture allowed to stand at room temperature for 48 hours. Seventy-five volumes of water were then added, together with sufficient dilute sulphuric acid to bring the solution to pH 4–5. Continuous extraction of the solution with ether for 72 hours, followed by evaporation of the ether extract afforded 3-hydroxy-4-(1-hydroxyethyl) pyridine as a syrup; the structure of the product was confirmed by proton magnetic reconance spectroscopy.

Manganese dioxide was prepared by mixing hot solutions of $KMnO_4$ ( 100 parts) and $MnSO_4 \cdot 4H_2O$ (200 parts) in water, filtering off the precipitate and washing it with much water and then with acetone. After drying it was used quickly.

The 3-hydroxy-4-(1hydroxyethyl pyridine was dissolved as far as possible in 500 volumes of chloroform; the manganese dioxide was then added and the whole mixed by shaking. The resulting thick slurry was agitated occasionally during 24 hours, and then filtered. The insoluble material was slurried again with several successive portions of chloroform, and the total filtrates combined and evaporated to a syrup, which was distilled under reduced pressure; most of the syrup distilled at 210°-220° C at 15 mm pressure. The distillate was a moderately viscous oil which solidified on cooling in ice and became completely liquid on warming to 40° C. Infra-red and proton magnetic resonance spectra confirmed that the distillate was 4-acetyl-3-hydroxypyridine.

c. 7-Azachromone-2-carboxylic acid

Sodium tert butoxide was prepared from:

| Sodium hydride (dry) | 0.5 parts |
| tert. butanol | 4 volumes |
| dry benzene | 20 volumes |

To this was added a solution of

| 4-acetyl-3-hydroxypyridine | 1.3 parts |
| in dry benzene | 20 volumes. |

The mixture was stirred under nitrogen for 2 hr. at 25° C, then a solution of freshly prepared tert.butyl oxalate (3 parts) in benzene (20 volumes) was added in one portion with vigorous stirring. After standing for 18 hours with occasional agitation the mixture was evaporated to dryness, and most of the excess of tert. butyl oxalate leached out by boiling with 40-60 petroleum ether, which was then decanted off. The insoluble residue was baked dry under vacuo at 60° C, then treated with a solution of glacial acetic acid (2 volumes) in water (15 volumes), cooled, collected, washed with cold water, and dried at 60° C, to yield crude tert. butyl 3-hydroxyisonicotinoyl-pyrurate(Proton magnetic resonance spectroscopy confirmed this structure, but also indicated the presence of some tert. butyl oxalate).

A mixture of

| Tert. Butyl 3-hydroxyisonicotinoylpyruvate | 1.1 part |
| ethylmethylketone | 50 volume |
| benzene | 50 volume |
| p. toluenesulphonic acid (hydrated) | 1.1 part | was heated under reflux with stirring for 24 hours, water being collected in a Dean and Stark trap. After cooling the reaction mixture was extracted with two successive portions, of 15 and 5 volumes respectively, of 10 percent aqueous sodium acetate. The aqueous extracts were combined, treated with a little decolorizing charcoal, filtered and acidified to pH 1-2 by the addition of syrupy phosphoric acid. The precipitated 7-azachromone-2-carboxylic acid was collected, washed with cold water and dried at 60° C, to give a product mp 299° C (dec.).

Crystallization from boiling water gave a nearly colorless product with m.p. 302° (dec.)

| analysis $C_9H_5O_4N$ requires | C:56.58 | H:2.64 | N:7.33% |
| found | C:56.92 | H:2.44 | N:7.80% |

(Proton magnetic resonance and infra-red spectra confirms the proposed structure).

d. Tert. Butyl 7-azachromone-2-carboxylate

The benzene-ethylmethylketone layer from the above reaction was treated with anhydrous $Na_2SO_4$ and charcoal, filtered and evaporated to a syrup, which slowly crystallized. After two recrystallizations from $CCl_4$ (refrigeration was required) the tert. butyl ester of 7-azachromone-2-carboxylic acid, m.p. 108° C, was obtained (proton magnetic resonance spectroscopy confirms the proposed structure).

| analysis ($C_{13}H_{13}O_4N$) required | C: 63.13 | H: 5.30 | N: 5.66% |
| found | C: 63.23 | H: 5.11 | N: 5.94% |

Evaporation of the mother liquors from the crystallizations of the last compound, and crystallization from very cold methanol gave 0.15 parts mp 107° of the tert. butyl 7-azachromone-2-carboxylate.

EXAMPLE 2

5,7-Dimethyl-6-azachromone-2-carboxylic acid a. 3-Cyano-2,6-dimethyl-4-hydroxypyridine 3-Aminocrotononitrile was prepared by the reaction of acetonitrile with metallic sodium. The reaction of the 3-aminocrotononitrile with a large excess of ethyl acetoacetate, in presence of piperidine as catalyst, gave 3-cyano-2,6-dimethyl-4-hydroxypyridine, mp >330° C.

b. 3-Acetyl-2,6-dimethyl-4-hydroxypyridine

A solution of methylmagnesium iodide was prepared from:

| iodomethane | 7.5 volumes |
| magnesium turnings | 2.9 parts |
| and dry ether | 30 volumes | and was added to a suspension of:

| 3-cyano-2,6-dimethyl-4-hydroxypyridine | 5.5 parts |
| in tetrahydrofuran | 60 volumes |

After the initial vigorous reaction had subsided, about 30 volumes of solvent was distilled off (head temperature 57° C), and the remaining mixture heated under reflux for 4 hours with sit stirring and then allowed to stand for a further 18 hr at room temperature. Most of the solvent was then removed by distillation, and a solution of $NH_4Cl$ (12 parts) in water (50 volumes) added; the resulting suspension was heated on a steam-bath for 1 hr, acidified to pH 5-6 by the addition of glacial acetic acid, and continuously extracted with chloroform during 24 hours.

The chloroform extract was evaporated to dryness, leaving a pale brownish residue. This was dissolved in hot methanol, treated with decolorizing charcoal, filtered, and diluted with much ethyl acetate. Most of the methanol was distilled off and the solution in ethyl acetate was refrigerated, to give 3-acetyl-2,6-dimethyl-4-hydroxypyridine, mp 234° C.

Crystallization from a 4:1 mixture of ethyl propionate and n-propanol gave a product with mp 241° C.

| analysis $C_9H_{11}NO_2$ requires | C: 65.44 | H: 6.67 | N: 8.48% |
| found | C: 65.10 | H: 6.39 | N: 8.80% |

(infra-red and proton magnetic resonance spectra confirm this structure)

c. 5,7-Dimethyl-6-azachromone-2-carboxylic acid.

Sodium tert. butoxide was prepared from:

| Sodium hydride | 1.2 parts |
| dry benzene | 50 volumes |
| tert. butanol | 7.5 volumes. |

To this was added a suspension of:

| | |
|---|---|
| 3-acetyl-2,6-dimethyl-4-hydroxypyridine | 3 parts |
| in dry benzene | 50 volumes |

The suspension was allowed to stand at room temperature for 2 hours, with occasional agitation. A solution of:

| | |
|---|---|
| tert. butyl oxalate | 7 parts |
| in dry benzene | 25 volumes | was added all at once; the mixture was shaken well, and warmed on the steam bath for 2 hours with occasional swirling. The solvents were removed by evaporation under reduced pressure and the residue extracted with 3 portions, each of 150 volumes, of hot 40–60 petroleum ether. The insoluble material was dried in vacuo, and then treated with a solution of glacial acetic acid (3 volumes) in water (20 volumes). The precipitated ester was collected, washed well with water and dried at 55° C, to yield 4.4. parts of crude tert. butyl 2,6-dimethyl-4-hydroxynicotinoylpyruvate (proton magnetic resonance spectroscopy confirms this structure). This was converted to the azachromone without purification.

| | |
|---|---|
| tert. Butyl 2,6-dimethyl-4-hydroxy-nicotinoylpyruvate | 3 parts |
| p. toluenesulphonic acid (hydrated) | 3 parts |
| Ethyl methyl ketone | 50 volumes |
| benzene | 50 volumes |

The mixture was stirred and heated under reflux with collection of water in a Dean and Starke trap for 18 hours. The solvents were then evaporated under reduced pressure and the residue dissolved in the minimum amount of 50 percent aqueous methanol. The solution was passed through an IR400 ion-exchange resin (quarternary ammonium salt in the chloride form). The eluate was evaporated to small volume and partially neutralized (pH 3) by the addition of solid $KHCO_3$. The precipitated 5,7-dimethyl-6-azachromone-2-carboxylic acid was collected, washed with cold water and crystallized from boiling water, to yield 0.6 parts of a product with mp circa 270° C (dec.)

EXAMPLE 3

7-Methyl-8-azachromone-2-carboxylic acid

A. 3 Cyano-2-hydroxy-6-methylpyridine

This compound was prepared by the method of Kochetkov, Dok. Akad. Nauk USSR, 84, 289 (1952).

b. 3-Acetyl-2-hyroxy-6-methylpyridine

A Grignard reagent was prepared from iodomethane (9 volumes), magnesium turnings (3 parts) and dry ether (50 volumes). This solution was added quite rapidly to a stirred suspension of 3-cyano-2-hydroxy-6-methylpyridine (6.7 parts, finely powdered) in 25 volumes dry ether. A vigorous reaction took place with evolution of methane. The mixture was allowed to stand for 24 hours at room temperature by which time it had separated into an upper, mobile layer and a lower, viscous layer. The mixture was then heated for 1 hour on a hot-water bath, the ether distilled off, and the residue treated with 100 volumes of 10 percent w/v aqueous ammonium chloride. After heating for 60 minutes on the hot-water bath, the solution was brought to a pH of 5 by the addition of dilute sulphuric acid, cooled in ice, and the yellow crystalline product collected, washed with cold water and dried at 60° C, to yield 3-acetyl-2-hydroxy-6-methylpyridine melting at 209°–11°C. After crystallization from water the substance had a mp of 213° C.

| | | | |
|---|---|---|---|
| analysis: $C_8H_9O_2N$ requires | C 63.53 | H 6.00 | N 9.27% |
| found | C 63.29 | H 5.78 | N 9.47% |

The nuclear magnetic resonance spectrum confirms this s structure.

c. Tert. butyl 2-hydroxy-6-methylnicotinoylpyruvate

Sodium tert. butoxide was prepared as a suspension by the addition of tert. butanol (20 volumes) to sodium hydride (4.42 parts, 8.84 parts of 50 percent suspension in oil) in benzene (100 volumes), and heating the mixture for 10 minutes. While still hot, a solution of oxalyl chloride (5 volumes, 7.4 parts) in dry benzene (25 volumes) was added with stirring. The resulting mixture was heated under reflux for 30 minutes and then cooled to room temperature. A slurry of 3-acetyl-2-hydroxy-6-methylpyridine (4.4 parts) in dry benzene (15 volumes) was then added rapidly, the mixture allowed to stand at room temperature for 3 hours with occasional stirring, and then evaporated to dryness under reduced pressure. The unreacted tert. butyl oxalate was leached out by boiling with light petroleum (bp 40°–60° C) several portions of which were decanted off. The solvent was evaporated from the insoluble residue under reduced pressure, and an aqueous solution containing a slight excess of acetic acid was added. The yellow crystalline product was filtered off, washed with water and crystallized from a tert. butanol-water mixture (6:1), to yield a product with a decomposition point at about 200° C. Crystallization from ethyl acetate gave an analytically pure specimen of t-butyl 2-hydroxy-6-methylnicotinoylpyruvate, mp about 200° C (decomp.).

| | | | |
|---|---|---|---|
| analysis: $C_{14}H_{17}O_5N$: requires | C 60.20 | H 6.14 | N 5.02% |
| found | C 59.95 | H 5.82 | N 5.21% | d. 7-Methyl-8azachromone-2-carboxylic acid

A mixture of tert. butyl 2-hyroxy-6-methyl-nicotinoylpyruvate (2.8 parts) p. toluenesulphonic acid monohydrate (2.0 parts) ethyl methylketone (5 volumes) and benzene (60 volumes) was heated in a Dean and Stark apparatus (azeotropic distillation of water under reflux conditions) for a period of 24 hours. The reaction mixture was evaporated under reduced pressure to yield a brown gum, which on treatment with water (25 volumes) and solid potassium bicarbonate (0.9 parts) ) gave a precipitate of the free azachromone carboxylic acid. After crystallization from methanol (500 volumes) there remained a product with a decomposition point of about 312° C. Further crystallization from methanol gave an analytically pure specimen of 7-methyl-8-azachromone-2-carboxylic acid.

| | | | |
|---|---|---|---|
| analysis: $C_{10}H_7O_4N$: required | C 58.51 | H 3.44 | N 6.83% |
| found | C 58.29 | H 3.65 | N 6.64% |

EXAMPLE 4

2Ethoxycarbonyl-5-azachromone a. 2-Formyl-3-hydroxypyridine

2-Hydroxymethyl-3-hydroxypyridine was prepared by the method of Heinert and Martell, Tetrahedron, 3,54, (1958), and this then converted to 2-formyl-3-hydroxypyridine by the method of Heinert and Martell, JACS, 81, 3933 (1959).

b. 2-Acetyl-3-hydroxypyridine

A Grignard reagent was prepared from iodomethane (18.6 volumes) magnesium turnings (7.3 parts) and 200 volumes ether. When the reaction was complete, the solvent was largely distilled off (to remove any unreacted iodomethane and thereby avoid quaternization of the product) and the syrupy residue dissolved in fresh dry ether (100 volumes). This solution was added to a solution of 2-formyl-3-hydroxypyridine (crude, 12 parts) in dry tetrahydrofuran (20 volumes) and dry ether (20 volumes). The resulting mixture was allowed to stand for 18 hours, and was then heated under reflux for a further 3 hours. The solvents were distilled off, and the residue treated with a solution of sulphuric acid (16 parts, 9 volumes) in water (150 volumes), allowing any volatile material to distil out. The solution was neutralized to pH 5 by the cautious addition of solid potassium carbonate, and then continuously extracted with ether for 24 hours. The ether solution was dried over anhydrous sodium sulphate and decolorizing charcoal, filtered and evaporated to a syrup. The infra-red and nuclear magnetic resonance spectra of this syrup agreed with the structure of 3-hydroxy-2-(1-hydroxyethyl) pyridine. The syrup was dissolved in chloroform (600 volumes) and treated with freshly prepared manganese dioxide (from 110 parts $KMnO_4$ and 223 parts hydrated $MnSO_4$) and allowed to stand for 18 hours at room temperature. The insoluble $MnO_2$ was filtered off and washed with chloroform, and the filtrate evaporated carefully to dryness. (The $MnO_2$ was further extracted with chloroform in a Soxhlet apparatus, and the extract combined with the previous washing). This yielded about 4.5 parts of crude 2-acetyl-3-hydroxypyridine as a colorless, highly volatile solid, mp 56° C (with a strong 'mousy' smell). An analytically pure specimen was obtained by vacuum sublimation, mp 58° C. Infra-red and nuclear magnetic resonance spectra confirmed the proposed structure.

analysis: $C_7H_7O_2N$: requires C 60.90 H 5.61 N 10.15%
found C 61.01 H 5.51 N 10.43% c. Ethyl 3-hydroxypicolinoylpyruvate

Sodium ethoxide was prepared as a suspension in benzene by the addition of ethanol (3.1 volumes) to sodium hydride (2.5 parts, 50% in oil) in benzene (30 volumes). 2-acetyl-3-hydroxypyridine (3.3. parts) in benzene (20 volumes) was added, and the solution stirred at room temperature for 1 hour. Diethyl oxalate (6.5 volumes) was then added all at once and the mixture was allowed to stand at room temperature for 2 hours. Twenty volumes cold water was introduced, the mixture shaken quickly, separated, and the lower layer run into a solution of 5 volumes of glacial acetic acid in 10 volumes of water. The benzene layer was washed with two further 10 volume portions of water, and all the water washings combined. The precipitated ketoester was filtered off, washed with water and dried at 50° C. An analytically pure specimen of ethyl 3hydroxypicolinoylpyruvate, mp 92° C, was obtained by crystallization from methanol.

analysis: $C_{11}H_{11}NO_5$ requires C 55.69 H 4.68 N 5.91%
found C 55.49 H 4.94 N 5.81% d. 2-Ethoxycarbonyl-5-azachromone

A mixture of ethyl 3-hydroxypicolinoylpyruvate (0.24 parts), p. toluene-sulphonic acid monohydrate (0.2 parts), acetone (3 volumes), and benzene (10 volumes) was heated under reflux, with collection of water in a Dean and Stark apparatus, for 2 hours. The mixture was cooled, evaporated to dryness under reduced pressure and then treated with a solution of 0.105 parts of potassium bicarbonate in 2 volumes water. The mixture was extracted with chloroform (4×4 volume portions), and the extracts combined, dried over sodium sulphate and decolorizing charcoal, and filtered. The filtrate was evaporated, and the residue dried at 60° C to yield 2-ethoxycarbonyl-5-azachromone, mp 160°–163° C. An analytically pure specimen was obtained by crystallization from ethanol; it had mp 168° C.

analysis: $C_{11}H_9O_4N$: required C 60.27 H 4.14 N 6.39%
found C 60.12 H 4.28 N 6.61%

NMR and IR spectra agreed with the proposed structure.

EXAMPLE 5

2-Tert. butoxycarbonyl-5-azachromone

This compound was prepared using the process of Example 4 except that in step (c) sodium tert. butoxide and tert. butyl oxalate were used. The product was crystallized from carbon tetrachloride and acetone, and had mp 146°–7° C.

analysis: $C_{13}H_{13}O_4N$ requires: C 63.13 H 5.30 N 5.66%
found C 62.88 H 5.28 N 5.88%

The NMR and IR spectra agreed with the proposed structure.

EXAMPLE 6

5-Azachromone-2-carboxylic acid a) Tert. Butyl 3-hydroxypicolinoylpyruvate

Sodium tert. butoxide, as a suspension in benzene, was obtained by the reaction of sodium hydride (0.68 parts of 50 percent suspension in oil) with tert. butanol (3 volumes) in benzene (25 volumes). 2-Acetyl-3-hydroxy pyridine (0.85 parts, prepared as in Example 4) dissolved in benzene (5 volumes) was then added, followed after an interval of 1 hour by a solution of tert. butyl oxalate (2.5 parts) in benzene (10 volumes). The mixture was allowed to stand for 1½hr, at room temperature. The solvents were then evaporated under reduced pressure, and the residue extracted with 2 × 60 volume portions of boiling petroleum ether (bp 40°–60° C). The insoluble material was dried in vacuo, dissolved in 25 volumes of ice-water, and acidified with 1.5 volumes of glacial acetic acid. The precipitated keto-ester was collected, washed with water and dried at 60° C; it had mp 133° C. After crystallization from methanol or n - propanol the mp was raised to 142° C.

analysis: $C_{13}H_{15}O_5N$ requires    C 58.85    H 5.70    N 5.28%
                                found    C 60.36    H 5.72    N 6.24% b. 5-Azachromone-2-carboxylic acid

Tert. Butyl 3-hydroxypicolinoylpyruvate (1.4 parts), p-toluene-sulphonic acid monohydrate (1.4 parts), ethyl methyl ketone (120 volumes), and benzene (120 volumes) were heated under reflux for 18 hours in a Dean and Stark apparatus. The mixture was cooled and extracted with a solution of 1.9 parts hydrated sodium acetate in 20 volumes water, then with 0.4 parts hydrated sodium acetate in 6 volumes water. The aqueous extracts were combined and acidified by the addition of orthophosphoric acid. The precipitated 5-azachromone-2-carboxylic acid was filtered off, washed with a little ice-cold water and dried to yield a material with a decomposition point of about 275° C. Purification of this material was effected by dissolution in sodium acetate solution, treatment with decolorizing charcoal and acidification with orthophosphoric acid.

analysis: $C_9H_5O_4N$ requires:    C 56.58    H 2.64    N 7.33%
                            found    C 56.81    H 2.62    N 7.65%

The NMR and IR spectra agreed with the proposed structure.

EXAMPLE A

The compounds set out in Table I below were tested to assess their effectiveness in inhibiting antibody-antigen reactions.

In these tests, the effectiveness of the compounds of the invention in inhibiting the passive cutaneous anaphylaxis in rats was assessed. It has been proved that this form of test gives reliable qualitative indications of the ability of the compounds under test to inhibit antibody-antigen reactions in man.

In this test method Sprague-Dawley rats (male or female) having a body weight of from 100 to 150 gm. were infected by subcutaneous inoculation at weekly intervals with N braziliensis larvae in doses increasing from about 2,000 larvae per animal to 12,000 larvae per animal in order to establish the infection in the rats. After 8 weeks the rats were bled by heart puncture and 12–20 ml. of blood collected from each animal. The blood samples were then centrifuged at 3,500 rpm. for 30 minutes in order to obtain serum containing the antibody to N braziliensis.

A pilot sensitivity test was carried out to determine the least quantity of serum required to give a skin weal in control animals in the test described below of 2 cm. diameter. It was found that with rats in the body weight range 100–130 gm. serum diluted 1:8 with physiological saline solution gave satisfactory reactions. This diluted solution was called antibody serum A.

The antigen to react with the antibody in serum A was prepared by removing worms from the gut of the infected rats, homogenizing the worms, centrifuging the homogenate and collecting the supernatant liquor. This liquor was diluted with physiological saline to give a protein content of 10 milligrams/ml. and was known as serum B.

Sprague-Dawley rats in the body weight range 100 to 130 gm. were sensitized by intra dermal injection of 0.1 ml. of serum A into the right flank. Sensitivity was allowed to develop for 24 hours and the rats were then injected intraveneously with 1 ml./100 gm. body weight of a mixture of serum B (0.25 ml.), Evans Blue dye solution (0.25 ml.) and the solution of the compound under test (0.5 ml. of varying concentrations). Insoluble compounds were administered as a separate intraperitoneal injection 5 minutes before intravenous administration of serum B and Evans Blue dye. For each concentration of the compound under test five rats were injected. Five rats were used as controls in each test. The dosages of the compound under test were selected so as to give a range of inhibition values.

Thirty minutes after injection of serum B the rats were killed and the skins removed and reversed. The intensity of the anaphylactic reaction was assessed by comparing the size of the characteristic blue weal produced by spread of the Evans Blue dye from the sensitization site with the size of the weal in the control animals (20 mm diameter weal). The size of the weal was rated as 0 (no weal detected, i.e. 100 percent inhibition) to 4 (no difference in size of weal, i.e. no inhibition) and the percentage inhibition for each dose level calculated as:

Percent inhibition =
$$\frac{(\text{Control group score} - \text{treated group score}) \times 100}{\text{Control group score}}$$

The percentage inhibitions for the various dose levels were plotted graphically for each compound. From these graphs the dosage required to achieve a 50 percent inhibition of the anaphylactic reaction ($ID_{50}$) may be determined. These results are tabulated in Table I.

The sodium salts tested were produced by dissolving the free 2-carboxylic acid in a solution containing containing the stoichiometric amount of sodium bicarbonate, filtering and freeze drying the filtrate.

TABLE I

| Name of compound tested | $ID_{50}$ in mgs/Kg of the sodium salt. |
|---|---|
| 5-Azachromone-2-carboxylic acid sodium salt. | >10 |
| 5,7-Dimethyl-6-azachromone-2-carboxylic acid sodium salt. | 5.6 |
| 7-Azachromone-2-carboxylic acid sodium salt. | 12 |
| 7-Methyl-8-azachromone-2-carboxylic acid sodium salt. | ≈10 |

We claim:

1. A compound selected from the group of compounds of 5-, 6-, and 7- azachromones of the formulas,

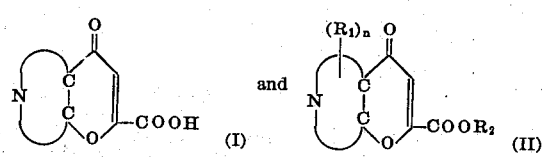

in which

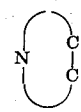

represents a pyridine ring fused on to the pyrone ring, $R_1$ is an alkyl or alkoxy group containing from one to six carbon atoms, $R_2$ is an alkyl group containing from one to 10 carbon atoms or an aminoalkyl group of the formula

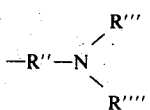

wherein R'' is an alkylene chain containing from one to four carbon atoms and R''' and R'''' are the same or different and each is selected from the group consisting of hydrogen or an alkyl group containing from one to four carbon atoms, or R''' and R'''' together with the nitrogen atom form a piperidine or morpholine ring, and $n$ is 0, 1 or 2, and pharmaceutically acceptable salts of the carboxylic acid of formula I and pharmaceutically acceptable acid addition salts of the compounds of the ester of formula II wherein $R_2$ is an amino-alkyl group.

2. A compound according to claim 1, selected from the group consisting of compounds having the structural formula I and the salts thereof, all as defined therein.

3. A compound according to claim 1, selected from the group consisting of compounds having the structural formula II and the salts thereof, all as defined therein.

4. A compound according to claim 2, which is 7-azachromone-2-carboxylic acid.

5. A compound according to claim 3 which is 2-ethoxycarbonyl-5-azachromone.

6. A compound according to claim 3 which is 2-tert. butoxycarbonyl-5-azachromone.

7. A compound according to claim 2 which is 5-azachromone-2-carboxylic acid.

8. A compound according to claim 1 in the form of the sodium salt thereof.

* * * * *

UNITED STATES PATENT OFFICE
CERTIFICATE OF CORRECTION

Patent No. 3,689,493          Dated September 5, 1972

Inventor(s) WILLIAM HUBERT HUNTER ET AL.

It is certified that error appears in the above-identified patent and that said Letters Patent are hereby corrected as shown below:

Column 1, after "[21] Application No. 20409"

insert --[30] Foreign Application Priority Data

March 29, 1969   Great Britain    16580/67--

Signed and sealed this 10th day of July 1973.

(SEAL)
Attest:

EDWARD M. FLETCHER, JR.         Rene Tegtmeyer
Attesting Officer             Acting Commissioner of Patents